United States Patent [19]

Ankeny

[11] 4,418,851
[45] Dec. 6, 1983

[54] VEHICLE SPARE TIRE CARRIER

[75] Inventor: V. Scott Ankeny, Blue Earth, Minn.

[73] Assignee: Tafco Equipment Company, Blue Earth, Minn.

[21] Appl. No.: 325,478

[22] Filed: Nov. 27, 1981

[51] Int. Cl.³ .......................................... B62D 43/02
[52] U.S. Cl. ............................. 224/42.06; 224/42.21; 414/463
[58] Field of Search .............. 280/152.05, 769; 224/42.03 R, 42.06, 42.08, 42.12, 42.21, 42.23, 42.44; 296/50, 51; 293/102, 117; 248/284; 211/20, 21, 23; 414/463

[56] References Cited

U.S. PATENT DOCUMENTS

| | | | |
|---|---|---|---|
| 3,273,767 | 9/1966 | Moore | 224/42.08 X |
| 3,362,597 | 1/1968 | Beach, Jr. | 224/42.21 |
| 3,613,971 | 10/1971 | Betz | 224/42.06 X |
| 3,862,696 | 1/1975 | McCauley et al. | 224/42.23 X |
| 4,061,257 | 12/1977 | St. Clair | 224/42.08 |
| 4,099,760 | 7/1978 | Mascotte et al. | 224/42.08 X |
| 4,241,858 | 12/1980 | Lawroski | 224/42.03 R X |

Primary Examiner—William Price
Assistant Examiner—Gary E. Elkins
Attorney, Agent, or Firm—Wicks & Nemer

[57] ABSTRACT

A vehicle spare tire carrier is disclosed according to the teachings of the present invention for the storage and transportation of a spare tire outside of a vehicle. Specifically, the spare tire carrier includes first and second arms pivotally attached to each other and a vehicle. The spare tire is mounted to the first arm. The carrier can then be pivoted from a first position to a second position simultaneously with an opening or closure, such as a door, of the vehicle. In the preferred embodiment, the entire weight of the carrier and the spare tire mounted thereto is transferred to the bumper attached to the vehicle frame and not to the vehicle body.

12 Claims, 4 Drawing Figures

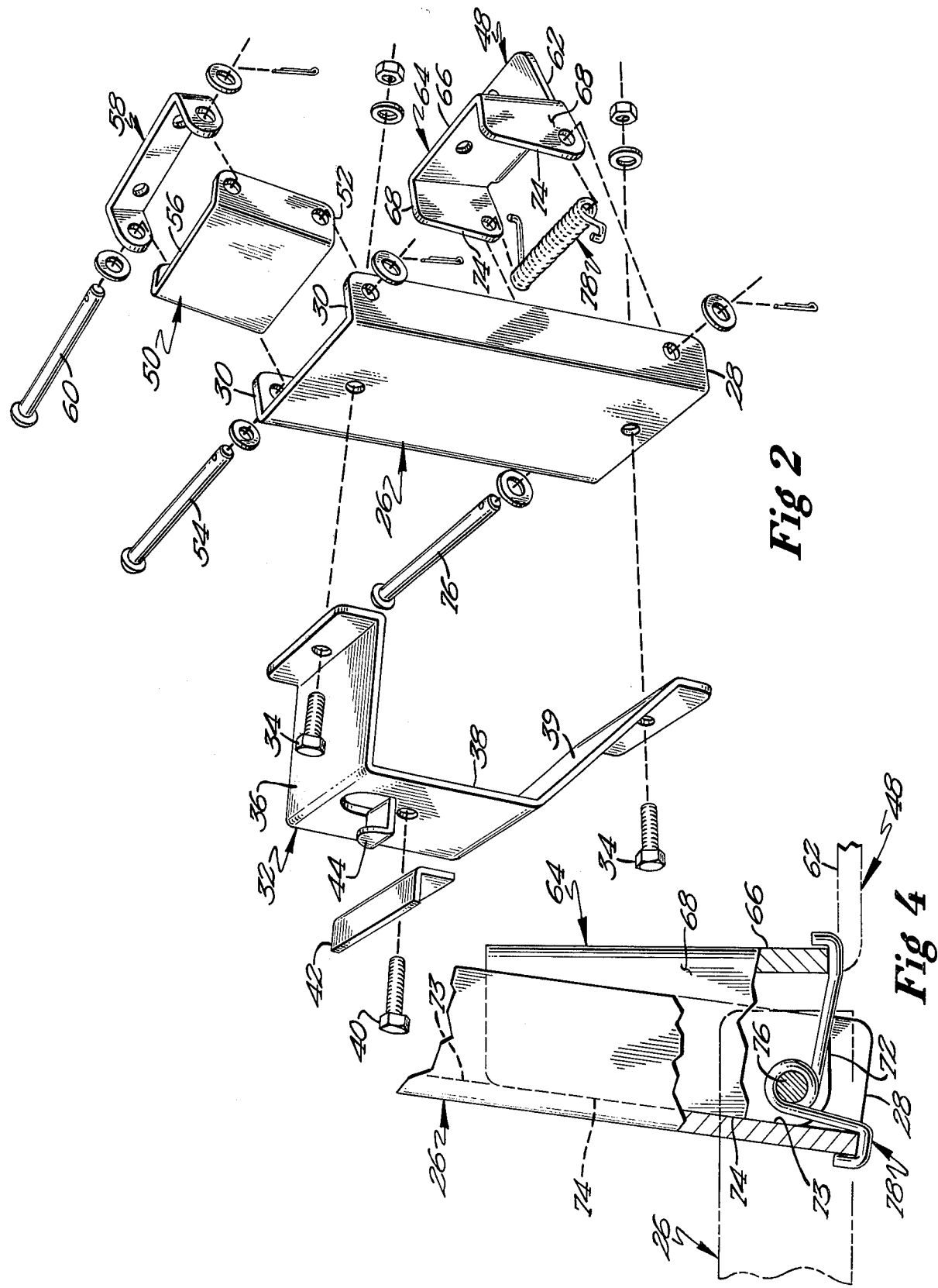

VEHICLE SPARE TIRE CARRIER

BACKGROUND

This invention relates generally to spare tire carriers and more specifically to spare tire carriers for the storage and transportation of spare tires outside of a vehicle.

With the increasing popularity of pickup type vehicles, there is an increasing need for spare tire carriers allowing the removal of the spare tire from the interior of the vehicle to a position outside of the vehicle and thus creating more usable space inside the vehicle. Prior known spare tire carriers which attempted to solve this need were deficient for many reasons including not being very handy as well as subjecting the vehicle body to stresses for which they were not designed and incapable of handling. The present invention then provides an improved vehicle spare tire carrier which allows the storage and transportation of a spare tire outside of a vehicle and which is not plagued with the problems of prior known spare tire carriers.

It is thus an object of the present invention to provide an improved vehicle spare tire carrier.

It is a further object of the present invention to provide such a vehicle spare tire carrier allowing the storage and transportation of a spare tire outside of a vehicle.

It is a further object of the present invention in the most preferred case to provide such a vehicle spare tire carrier which transfers the weight of the carrier and spare tire mounted thereon to the vehicle substructure and not to the vehicle body.

It is a further object of the present invention to provide such a vehicle spare tire carrier which is pivotally mounted to the vehicle.

It is a further object of the present invention in the most preferred case to provide such a vehicle spare tire carrier which is pivotal simultaneously with the vehicle closure from its closed position to its open position.

It is a further object of the present invention in the most preferred case to provide a spare tire carrier including first and second arms having an overcenter type pivotal relation.

It is further an object of the present invention to provide such a vehicle spare tire carrier which is of simple design, can be easily manufactured and assembled from generally inexpensive parts.

It is a further object of the present invention to provide such a vehicle spare tire carrier which can be readily attached to a motor vehicle without the need for reinforcing the vehicle body or other vehicle portions.

These and further objects and advantages of the present invention will become clearer in the light of the following detailed description of an illustrative embodiment of this invention described in connection with the drawings.

DESCRIPTION OF THE DRAWINGS

The illustrative embodiment may thus be best described by reference to the accompanying drawings where:

FIG. 2 shows an exploded perspective view of the spare tire carrier of FIG. 1.

FIG. 4 shows an enlarged, partial side view of a portion of the spare tire carrier of FIG. 1.

Figure 1:
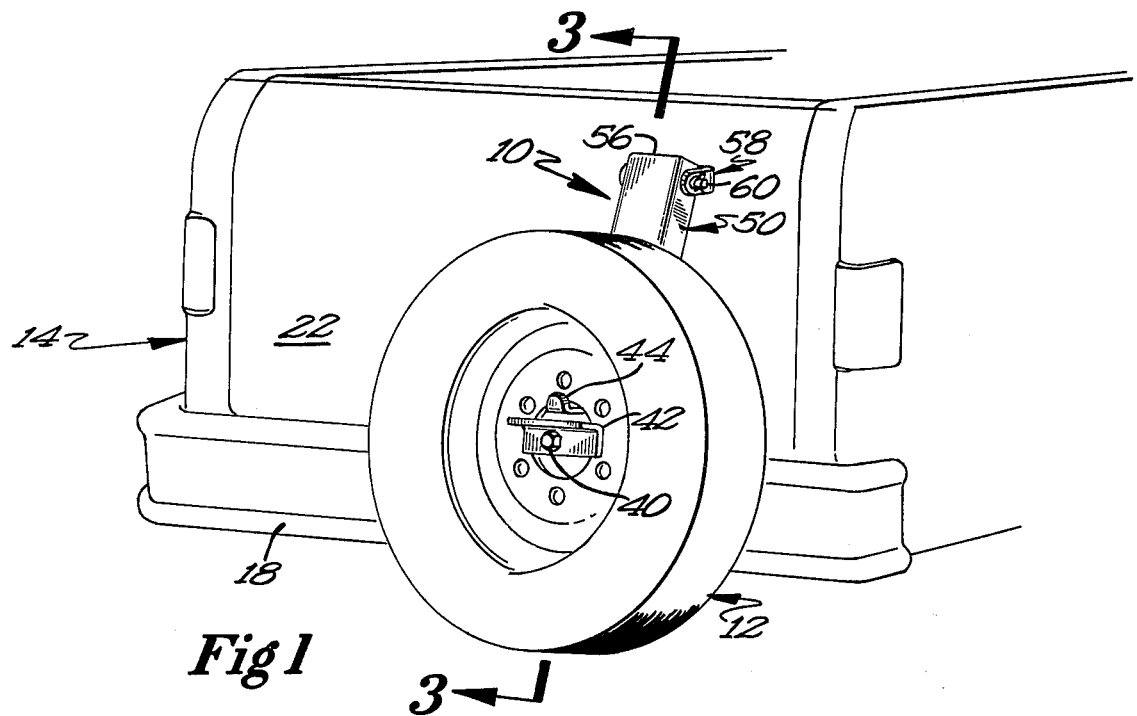
FIG. 1 shows a perspective view of a vehicle spare tire carrier according to the present invention mounted on a vehicle.

All figures are drawn for ease of explanation of the basic teachings of the present invention only; the extensions of the figures with respect to number, position, relationship, and dimensions of the parts to form the preferred embodiment will be explained or will be obvious from the explanation given.

Where used in the various figures of the drawings, the same numerals designate the same or similar parts in the spare tire carrier. Furthermore, when the terms "right", "left", "vertical", "horizontal", "first", "second", and similar terms are used herein, it should be understood that these terms have reference only to the structure shown in the drawings as it would appear to a person viewing the drawings and are utilized only to facilitate describing the invention.

DESCRIPTION

Referring to the drawings, a vehicle spare tire carrier according to the teachings of the present invention is shown and generally indicated as 10. Generally, carrier 10 stores and transports a vehicle spare tire 12 for a motor vehicle 14. Vehicle 14 includes a superstructure or frame 16 to which a vehicle bumper 18 is attached. Vehicle 14 further includes vehicle body 20. Body 20 includes a closure member, door, tailgate, or endgate 22 which is pivotal from a closed position to an open position about a pivot axis 24. In the preferred embodiment, pivot axis 24 is horizontal such that tailgate 22 is pivotal from a vertical closed position to a horizontal open position.

Carrier 10 includes a first, lower arm 26 having a first end 28 and second end 30. Arm 26 is elongated, in the preferred embodiment, has a length which is less than the diameter of tire 12, and has a U-shaped cross section. Arm 26 further includes provisions for mounting tire 12 thereto. In the preferred embodiment, a tire mounting bracket 32 is attached thereto by bolts 34. Bracket 32 includes a first leg 36 which extends generally perpendicular to arm 26, a second leg 38 which extends generally perpendicular from leg 36 and parallel to arm 26, and a third leg 39 which extends angularly from leg 38 and arm 26. Thus, when arm 26 is in a vertical position, leg 36 acts as a shelf in positioning tire 12 for attachment to bracket 32. In the preferred embodiment, tire 12 is attached to bracket 32 by a bolt 40 which extends through an abutting member 42 which abuts with the rim of tire 12. A hook member 44 can further be provided for holding tire 12 on bracket 32 while bolt 40 is being positioned and fastened.

Carrier 10 further includes provisions for pivoting arm 26 with tailgate 22 which, in the preferred embodiment, is shown in the form of a lower pivot member 48 pivotally attached to end 28 of arm 26 and attached to vehicle 14 along with a second, upper arm 50 pivotally attached to end 30 of arm 26 and to tailgate 22.

In the preferred embodiment, arm 50 is elongated but has a length shorter than the length of arm 26 and has a U-shaped cross section. Arm 50 includes a first end 52 pivotally attached to end 30 of arm 26 about a pivot member which forms axis 54 which is parallel to axis 24. For pivotally mounting second end 56 of arm 50 to tailgate 22, an upper pivot member 58 is provided, attached to tailgate 22, and pivotally attached to end 56 of arm 50 about a further pivot member which forms axis 60. Axis 60 is parallel to axes 24 and 54. In the preferred embodiment, upper pivot member 58 has a U-shape.

Lower pivot member 48 includes a first generally flat member 62 and a second generally U-shaped member 64 extending generally perpendicular thereto. Member 64 includes a generally flat section 66 having legs 68 extending from the opposite sides thereof. Lower pivot member 48 is arranged, in the preferred embodiment, to be attached to vehicle frame 16, and in the preferred embodiment, is attached to bumper 18 by bolts 70 which extend through member 62 and section 66 of member 48.

Legs 68 of member 48 include a first abutting surface 72, best shown in FIG. 4, which extends parallel to member 62 and which is generally parallel to tailgate 22 in its open position. A second abutting surface 74, also shown in FIG. 4, extends at an angle slightly less than 90° from surface 72 and generally parallel to tailgate 22 in its closed position.

End 28 of arm 26 is pivotally attached to member 48 by a pivot member which forms axis 76 which extends through legs 68 of member 48 and arm 26. Axis 76 is parallel to axes 24, 54, and 60. A torsion spring 78 biases arm 26 with respect to member 48.

Figure 3:
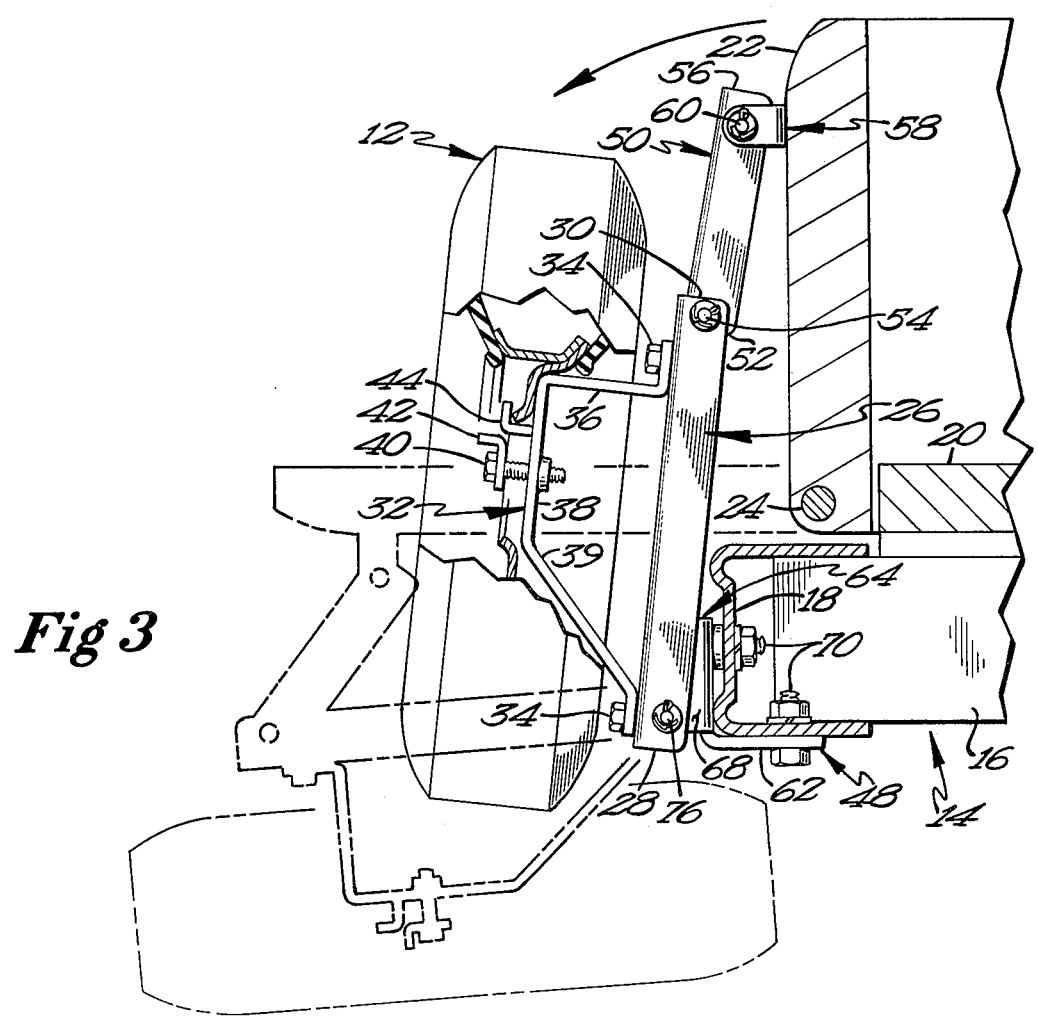
FIG. 3 shows a side view of the spare tire carrier of FIG. 1, with portions of the spare tire shown as broken away and a phantom position shown.

In use, when tire carrier 10 is in its first position as shown in solid lines in FIG. 3, tire 12 can be attached to or removed from bracket 32 in a manner similar to conventional tire carriers. In operation, in the first position of carrier 10, arms 26 and 50 are generally in line, or in other words, generally parallel to each other, with arm 50 extending from second end 30 of arm 26. If it is desired to open closure 22, closure 22 is simply opened and pivoted from its first closed position to its second open position as if carrier 10 were not located on vehicle 14 or attached to closure 22. Thus, as closure 22 pivots about axis 24, arms 26 and 50 similarly pivot about axes 54, 60, and 76 to its second position as shown in phantom in FIG. 3. Thus, arms 26 and 50 pivot in relation to each other, or in other words, fold from their first generally straight position to their second angular or folded position. In the preferred embodiment, arms 26 and 50 are approximately at a 50° angle in the second position of carrier 10.

In its second position, arm 50 is at an angle to arm 26 and in the preferred embodiment, does not extend generally beyond second end 30 of arm 26. Specifically, due to the length of arm 26, tire 12 extends beyond second end 30 of arm 26 such that tire 12 prevents someone from accidentally bumping into pivotal ends 30 and 52 of arms 26 and 50, respectively. Additionally, due to the lengths of arms 26 and 50 in the preferred embodiment of the present invention, in its second position, pivotal ends 30 and 52 of arms 26 and 50, respectively, extend equidistant with closure 22 or in other words to a point generally vertically below the end of closure 22 and thus do not obstructively protrude beyond closure 22 and thus present an obstruction point to passers-by even when tire 12 is removed from carrier 10.

Thus, it can be appreciated that the respective and comparative lengths of arms 26 and 50 of the preferred embodiment of the present invention allow an overcenter type of mounting of arms 26 and 50 as described and provides several advantages, some of which are set forth hereinbefore.

Prior to the present invention, known spare tire carriers are considered to have had serious shortcomings. For example, many tire carriers were attached to and supported by vehicle body 20 rather than frame 16 or bumper 18. Therefore, it was necessary to reinforce body 20 at the attachment locations which often required removal and replacement of the vehicle interior, and thus was very time consuming. Further, due to bouncing and jars as vehicle 14 travelled along a roadbed, prior art carriers would often pull away from body 20, thus damaging body 20.

Further, many known prior tire carriers required that the tire carrier be pivoted out of the way and separately from closure 22 before closure 22 could be opened. Thus, a two step procedure was necessary, first to unlatched and pivot the tire carrier and second to unlatch and pivot closure 22. Thus, these known prior tire carriers do not work simultaneously with closure 22, as does the present invention, but must be operated separately. This is not very handy and is a time consuming procedure.

Additionally, many known prior tire carriers prevented operation of the vehicle with closure 22 in its open position because the tire carrier could not be secured with closure 22 in its open position.

The present invention solves these and other problems of the prior art. Specifically, carrier 10 according to the teachings of the present invention operates simultaneously with closure 22. Specifically, closure 22 can be opened and closed as if carrier 10 were not connected to vehicle 14. Carrier 10 pivots simultaneously with closure 22 in a single procedure. Thus, the two step procedure of the prior art is not required.

Further, in the preferred embodiment, spring 78 can be arranged to compensate for the added pivotal load on closure 22 and permit closure 22 to open and close as if carrier 10 were not mounted thereon. Additionally, spring 78 can be arranged as a two position torsion spring such that carrier 10 will not hold closure 22 in a position between its open and closed position when tire 12 is removed from carrier 10.

Further, carrier 10 of the present invention, in its most preferred mode, transfers all weight of carrier 10 and the spare tire mounted thereto to frame 16 of vehicle 14, and thus, carrier 10 is carried by frame 16 of vehicle 14 rather than vehicle body 20. Specifically, lower pivot member 48 receives all the weight of carrier 10 which transfers the weight to bumper 18 which in turn transfers the weight to frame 16. Additionally, due to the construction of pivot member 48 of the preferred embodiment of the present invention and specifically due to the overcenter pivoting arrangement of arm 26 with pivot member 48 at pivot axis 76, when carrier 10 is in its lowered position, inside surface 73 of arm 26 abuts with surface 72 and thus acts as a stop for carrier 10 to prevent arm 26 from pivoting therebeyond. Thus, when closure 22 is in its open position, the weight of carrier 10 is carried by pivot member 48 through arm 26 and surfaces 72 and 73 and thus carrier 10 does not place any weight on closure 22 and eliminates unnecessary forces and stress on closure 22. Further, it can then be appreciated that vehicle 14 can be operated with carrier 10 and closure 22 in its open position.

In its raised or transport position when closure 22 is in its closed position, the weight of carrier 10 is transferred to pivot member 48 by inside surface 73 of arm 26 abutting with surface 74. In the preferred embodiment of the present invention with surface 74 being at an angle slightly less than 90°, or in other words surface 74 is at a slight angle to the vertical, the weight transfer at surface 74 is enhanced. Thus, surface 74 stops any further movement of arm 26 therebeyond and further eliminates unnecessary forces and stresses on closure 22.

Now that the basic teachings of the present invention have been explained, many extensions and variations will be obvious to one having ordinary skill in the art. For example, although carrier 10 is especially adapted for and preferred for use with vehicles having closures which pivot about a horizontal axis, carriers 10 utilizing the teachings of the present invention could be constructed for vehicles having closures which pivot about a vertical axis.

Thus, since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims rather than by the foregoing description and all changes which come within the meaning and range of equivalency of the claims are intended to be embraced therein.

What is claimed is:

1. A spare tire carrier for a vehicle having a frame and a body attached thereto, with the frame including a bumper attached thereto and with the body including a closure door pivotally mounted about a horizontal pivot axis from a first, vertical, closed position to a second, horizontal, open position comprising, in combination: a lower arm having a first end and a second end; means for mounting the spare tire to the lower arm; a lower pivot member attached to the bumper of the vehicle for pivotally mounting the first end of the lower arm to the vehicle about a horizontal axis parallel to the horizontal pivot axis of the closure door; an upper arm having a first end and a second end, with the first end of the upper arm being pivotally mounted to the second end of the lower arm about a horizontal axis parallel to the horizontal pivot axis of the closure door; an upper pivot member attached to the closure door for pivotally mounting the second end of the upper arm to the closure door of the vehicle about a horizontal axis parallel to the horizontal pivot axis of the closure door, with the lower and upper pivot members and the upper arm allowing the simultaneous pivoting of the lower arm with the closure door of the vehicle from a first, generally vertical position to a second, generally horizontal position, with the lower pivot member including a first surface for abutting with the lower arm in its first, generally vertical position for preventing movement of the lower arm therebeyond and for enhancing the weight transfer of the spare tire to the lower pivot member and including a second abutting surface for abutting with the lower arm in its second, generally horizontal position for preventing movement of the lower arm therebeyond and for transferring counterforces from the lower arm to the lower pivot member, with the first surface being at an angle slightly less than 90 degrees from the vehicle to enhance the weight transfer of the spare tire to the lower pivot member; and torsion spring means for biasing the lower arm with respect to the lower pivot member for assisting the pivoting of the lower arm between its first position and its second position.

2. The spare tire carrier of claim 1 wherein the lower and upper arms have an overcenter pivot arrangement wherein the upper arm is generally in line with the lower arm in its first, generally vertical position and the upper arm is in an angular relation with the lower arm in its second, generally horizontal position.

3. The spare tire carrier of claim 1 wherein the length of the lower arm is less than the diameter of the spare tire and does not obstructively protrude beyond the closure door.

4. A spare tire carrier for a vehicle having a closure pivotally mounted about a pivot axis from a first closed position to a second open position comprising, in combination: a first arm having a first end and a second end; means for simultaneously pivoting the first arm from a first position to a second position with the closure of the vehicle comprising, in combination: means for pivotally mounting the first end of the first arm to the vehicle about an axis parallel to the pivot axis of the closure; a second arm having a first end and a second end, with the first end of the second arm being pivotally mounted to the second end of the first arm about an axis parallel to the pivot axis of the closure; and means for pivotally mounting the second end of the second arm to the closure of the vehicle about an axis parallel to the pivot axis of the closure; and means for mounting the spare tire to the spare tire carrier.

5. The spare tire carrier of claim 4 wherein the means for pivotally mounting the first end of the first arm to the vehicle includes means for preventing the first arm from pivoting beyond the second position and for receiving all of the weight of the first arm and spare tire mounted thereto for transference to the vehicle.

6. The spare tire carrier of claim 1 wherein the means for pivotally mounting the first end of the first arm to the vehicle includes a first surface for abutting with the first arm in its first position for transferring the weight of the first arm and the spare tire to the vehicle, with the first surface being at an angle slightly less than 90 degrees from the vehicle to enchance the weight transfer of the first arm and the spare tire to the vehicle.

7. The spare tire carrier of claim 5 or 6 wherein the vehicle includes a superstructure and a body, and wherein the means for pivotally mounting the first end of the first arm to the vehicle is attached to the superstructure of the vehicle and not the body of the vehicle.

8. The spare tire carrier of claim 4 wherein the pivot axis of the closure of the vehicle is horizontal such that the closure pivots from a first vertical position to a second horizontal position.

9. The spare tire carrier of claim 4 wherein the means for pivotally mounting the first end of the first arm to the vehicle includes means for biasing the first arm.

10. The spare tire carrier of claim 4 wherein the first and second arms have an overcenter relation, with the first and second arms being approximately in line in the first position such that the pivot axis between the closure and the second end of the second arm, the pivot axis between the first and second arms, and the pivot axis between the first end of the first arm and the vehicle are in line with the pivot axis between the first and second arms being intermediate the pivot axis between the closure and the second end of the second arm and the pivot axis between the first end of the first arm and the vehicle; and with the first and second arms being in an angular relation in the second position.

11. The spare tire carrier of claim 10 wherein the length of the first arm is less than the diameter of the tire and wherein in the second position, the second arm does not generally extend beyond the second end of the first arm.

12. The spare tire carrier of claim 4 wherein the spare tire mounting means is attached to the first arm.

* * * * *